April 7, 1970   D. LEJEUNE   3,504,726
VALVE STEM
Filed July 6, 1967
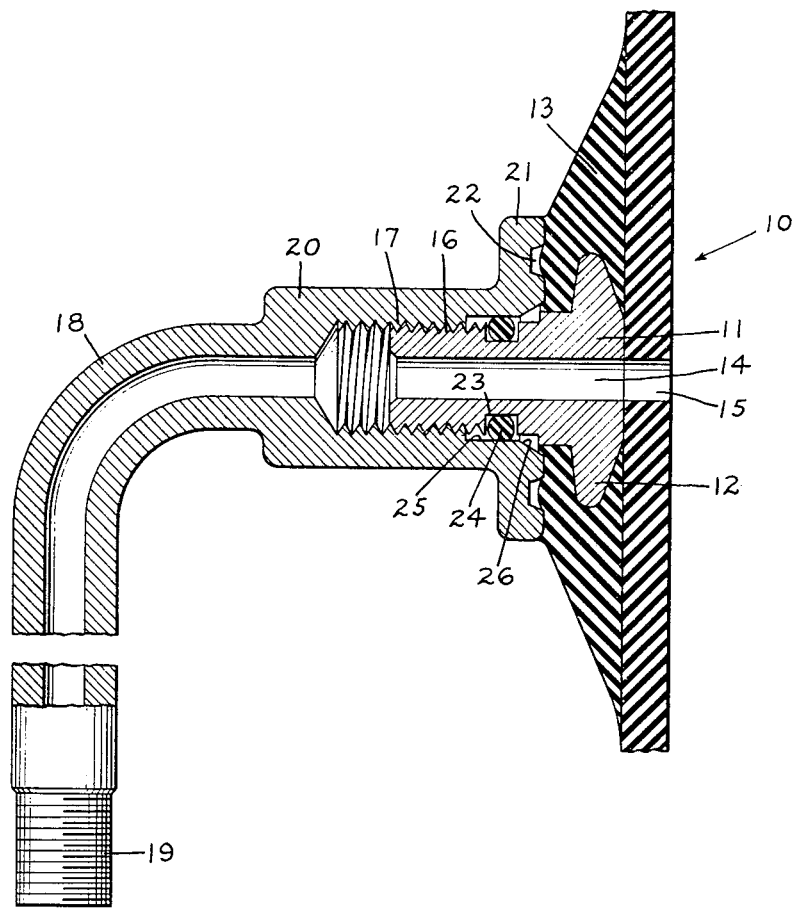
INVENTOR
DANIEL LEJEUNE
BY
Brumbaugh, Free, Graves & Donohue
HIS ATTORNEYS United States Patent Office 3,504,726
Patented Apr. 7, 1970

3,504,726
VALVE STEM
Daniel Lejeune, Clermont-Ferrand, France, assignor to Compagnie Generale de Etablissements Michelin raison sociale Michelin & Cie, Clermont-Ferrand, France
Filed July 6, 1967, Ser. No. 651,611
Claims priority, application France, July 19, 1966, 69,999
Int. Cl. B60c 29/00
U.S. Cl. 152—429                                  3 Claims

ABSTRACT OF THE DISCLOSURE

An improvement in valves for tubes for pneumatic tires in which the fixed stem portion or barrel of the valve of an inner tube is threaded into a valve stem extension to accommodate it to different styles of wheels and hub caps and in which an air-tight seal is provided between the fixed barrel and the stem extension by means of an O-ring mounted in a groove in the barrel and in sealing engagement with a smooth wall in the stem extension, the stem extension being threaded on the barrel outwardly of the O-ring seal and the stem extension further having a flange thereon for engaging the inner tube or for compressing a gasket against the inner tube when the stem extension is used on an inner tube having a conventional barrel affixed thereto.

---

This invention relates to improvements in valves for inner tubes for pneumatic tires, and more particularly to improvements in so-called "universal valve stems" for inner tubes.

Universal valve stems consist of two parts, one of which is a hollow stem portion or barrel which is secured to the inner tube by means of a rubber collar vulcanized or otherwise secured to the inner tube, and the other, part of which is called a valve stem extension, which is assembled on the barrel by means of screw threads. Airtightness is obtained between the barrel and the stem extension by means of a flat gasket slipped over the barrel and compressed against the inner tube by means of a flange on the stem extension either integral with the stem extension or attached to the end of the valve stem either in fixed or in rotatable relation thereto. Such universal value stems enable inner tubes to be used with different types of rims and wheels and hub caps by choosing valve stem extensions of suitable length and shape. The universal valve stems described above are not entirely satisfactory for the reason that, in some instances, leaks occur between the barrel and the stem extension. Leakage may occur for several reasons. Inasmuch as the stem extension is threaded on the barrel, loosening of the stem extension will reduce compression of the gasket which the stem extension presses against the stem-mounting collar on the inner tube. Also, heating of the valve stem as a whole due to proximity to the brake drum may also cause a reduction of the compression of the gasket and allow loosening of the stem extension on the barrel. In any of these cases, leakage of air from the tube may occur between the barrel and the extension since the air check valve is normally mounted in the outer end of the valve stem extension.

In accordance with the present invention, a novel valve stem is provided which overcomes the deficiencies of the prior universal valve stems with respect to air leakage at the joint between the extension and the barrel but nevertheless permits the stem extension of the new universal valve to be used with an old type barrel or enables an old type of stem extension to be used with the new type of barrel.

More particularly, the new valve stem includes a barrel joined at its inner end to the inner tube and having an outer threaded end and a groove interposed between the threaded portion and the inner tube for receiving an O-ring formed of a suitable elastomer to effect a seal between the barrel and a smooth cylindrical surface at the inner end of the valve stem extension which is threaded on the threaded end portion of the barrel, the valve stem extension further including a flange at its inner end which can be pressed against the inner tube or the collar in which the barrel has its inner end embedded.

Inasmuch as the O-ring seal provided in the new valve stem does not depend for its sealing effect upon compression other than between the cylindrical surface in the stem extension and the walls of the groove in the barrel, loosening or tightening by partial rotation of the extension or thermal expansion and contraction of the valve stem does not have any effect on the sealing effectiveness of the O-ring. Moreover, the presence of the flange at the inner end of the valve stem extension provides a further seal and resistance to rotation of the stem extension relative to the barrel as well as affording a means for compressing a flat gasket or sealing ring against the inner tube or the collar in the event that the new valve stem extension is used with an old type of valve stem barrel.

For a better understanding of the present invention, reference may be had to the accompanying drawings in which the single figure is a view in side elevation and partially broken away of a valve stem and inner tube embodying the present invention.

The inner tube 10, a portion only of which is shown in the drawing, may be of any desired type and may be formed of any of the elastomers commonly used in inner tubes. Mounted on the inner tube 10 is a valve stem portion or barrel 11 having an inner flanged or mushroom-shaped end 12 embedded in and vulcanized or otherwise secured to an annular collar 13 composed of a suitable elastomer vulcanized or otherwise united with the inner tube 10. The barrel 11 has a central passage 14 aligned with an opening 15 in the inner tube and is provided with a threaded portion 16 for receiving the internally threaded portion 17 of a valve stem extension 18 which, as illustrated, is bent angularly, but may be straight and of any desired length to cooperate with a rim, wheel or hub cap of a vehicle. The valve stem extension 18 is provided with a threaded end portion 19 for receiving a valve cap, not shown, and may be internally threaded to receive a conventional air check valve. The inner end of the valve stem extension 18 has an enlarged cylindrical portion 20 with an annular flange 21 at its inner end adapted to bear against the collar 13. An annular groove 22 is in the flange aids in producing a seal between the valve stem extension and the collar 13 or for retaining a flat gasket, not shown, in sealing relation to the valve stem extension 18 and the collar 13 when the valve stem extension is used with a barrel of a conventional universal valve.

Differing from conventional universal valves, the barrel 11 is provided with a circumferential groove 23 between the threaded portion 16 and the collar 13 for receiving the O-ring 24 formed of rubber, neoprene or other suitable elatsomeric material. The depth of the groove 23 is such that the O-ring extends outwardly beyond the periphery of the threaded portion 16 of the barrel and engages a cylindrical wall 25 of a bore in the valve stem extension of larger diameter than the threaded portion 16 of the barrel so that the O-ring is compressed between the cylindrical surface 25 and the bottom of the groove 23, thereby producing an air-tight seal therebetween. To facilitate the application of the valve stem extension to the barrel, the inner end of the wall or surface 25 has a chamfered end 26.

With the O-ring type of seal described above, an airtight seal is provided even through the valve stem extension 18 is not screwed up as far as possible on the barrel 11 and in fact a relatively loose fit of the valve stem extension on the barrel will not destroy the seal provided by the O-ring 24. Moreover, expansion and contraction of the valve stem extension 18 or the barrel 11 will not affect the seal so long as the O-ring 24 engages any portion of the cylindrical surface 25 in the valve stem extension. Accordingly, the leakage caused by temperature effects or looseness of fit which adversely affected the earlier universal valve stem is completely eliminated by the new stem.

The valve stem extension 18 can be used with the barrel of the prior universal valve stem for the reason that the flange 21 and groove 22 thereon are capable of clamping the usual flat annular gasket securely to the collar 13. Moreover, the new barrel can be used with the old type of universal valve stem extension merely by omitting the O-ring and utilizing the conventional flat annular gasket as a sealing means between the valve stem extension and the collar 13 or inner tube 10.

A further practical advantage of the valve stems embodying the present invention is that their manufacture is no more costly than the prior valve stems and in fact, in many instances, is even less.

It will be understood that the new valve stem can be adapted to all sizes of tires and to all types and wheel sizes and rim sizes as well as various types of hub caps which are mounted on the wheels.

Accordingly, it will be understood the valve stem disclosed is illustrative and that the invention is limited only as defined in the following claims.

I claim:
1. A valve assembly for an inner tube comprising barrel means having one end for attachment to an inner tube formed of an elastomeric material and an outer end, connection means on said outer end of said barrel means, a peripheral groove in said barrel means between said one end and said threaded means, O-ring means in said groove, tubular stem extension means having a smooth internal wall adjacent to one end thereof for slidably engaging and compressing said O-ring means and connection means between said smooth internal wall and the opposite end of said extension for connection with the connection means of said barrel means, and an outwardly extending peripheral flange on said one end of said stem extension means for engagement with said inner tube when said connection means on said barrel means and stem extension means are connected, whereby two seals are formed in series.

2. The valve assembly set forth in claim 1 wherein said flange is formed with an annular groove and said barrel means is formed about an axis with which said groove is substantially concentric.

3. The valve assembly set forth in claim 1 wherein said tubular stem extension means is formed with a chamfered surface at one end of said internal wall at said one end of said stem extension means.

References Cited

UNITED STATES PATENTS

| | | | |
|---|---|---|---|
| 1,819,872 | 8/1931 | Cooke et al. | 152—429 |
| 2,495,955 | 1/1950 | Bourdon | 152—429 |
| 2,971,526 | 2/1961 | Boyer et al. | 152—429 |

ARTHUR L. LA POINT, Primary Examiner

C. B. LYON, Assistant Examiner